(12) United States Patent
Andersen et al.

(10) Patent No.: US 10,538,459 B2
(45) Date of Patent: Jan. 21, 2020

(54) EXTRUDED CEMENT BASED MATERIALS

(71) Applicants: Evan R. Daniels, Dallas, TX (US); THE INTELLECTUAL GORILLA GMBH, Entlebuch (CH)

(72) Inventors: Per Just Andersen, Dorfen (DE); Evan R. Daniels, Dallas, TX (US)

(73) Assignee: The Intellectual Gorilla GmbH, Sempach Station (CH)

( * ) Notice: Subject to any disclaimer, the term of this patent is extended or adjusted under 35 U.S.C. 154(b) by 340 days.

(21) Appl. No.: 15/315,536

(22) PCT Filed: Jun. 5, 2015

(86) PCT No.: PCT/US2015/034397
§ 371 (c)(1),
(2) Date: Dec. 1, 2016

(87) PCT Pub. No.: WO2015/188054
PCT Pub. Date: Dec. 10, 2015

(65) Prior Publication Data
US 2017/0113971 A1    Apr. 27, 2017

Related U.S. Application Data

(60) Provisional application No. 62/007,984, filed on Jun. 5, 2014.

(51) Int. Cl.
| | | |
|---|---|---|
| C04B 28/14 | (2006.01) |
| C04B 28/04 | (2006.01) |
| C04B 28/02 | (2006.01) |
| B28B 11/16 | (2006.01) |
| B28B 11/24 | (2006.01) |
| C04B 20/00 | (2006.01) |
| C04B 111/00 | (2006.01) |
| C04B 111/40 | (2006.01) |
| C04B 103/20 | (2006.01) |
| C04B 103/00 | (2006.01) |
| C04B 103/22 | (2006.01) |

(52) U.S. Cl.
CPC .............. C04B 28/14 (2013.01); B28B 11/16 (2013.01); B28B 11/243 (2013.01); C04B 20/0048 (2013.01); C04B 28/02 (2013.01); C04B 28/04 (2013.01); *C04B 2103/0079* (2013.01); *C04B 2103/20* (2013.01); *C04B 2103/22* (2013.01); *C04B 2111/00129* (2013.01); *C04B 2111/40* (2013.01); *Y02W 30/92* (2015.05); *Y02W 30/94* (2015.05); *Y02W 30/97* (2015.05)

(58) Field of Classification Search
CPC ..... Y02W 30/97; Y02W 30/92; Y02W 30/94; C04B 2103/22; C04B 28/04; C04B 28/14; C04B 2103/20; C04B 2111/00129; C04B 2111/40; C04B 28/02; C04B 2103/0079; C04B 20/0048; C04B 7/02; C04B 14/066; C04B 14/42; C04B 16/06; C04B 16/0633; C04B 16/0641; C04B 18/08; C04B 18/146; C04B 18/24; C04B 24/14; C04B 24/38; C04B 24/383; C04B 22/143; C04B 24/06; B28B 11/243; B28B 11/16
See application file for complete search history.

(56) References Cited

U.S. PATENT DOCUMENTS

| | | |
|---|---|---|
| 570,391 A | 10/1896 | Fox |
| 1,048,923 A | 12/1912 | Wheeler |
| 3,517,468 A | 6/1970 | Woods |
| 3,852,083 A | 12/1974 | Yang |
| 3,908,062 A | 9/1975 | Roberts |
| 3,987,600 A | 10/1976 | Baehr |
| 3,994,110 A | 11/1976 | Ropella |
| 4,014,149 A | 3/1977 | Yamamoto |
| 4,045,937 A | 9/1977 | Stucky |
| 4,075,804 A | 2/1978 | Zimmerman |
| 4,084,571 A | 4/1978 | McFarland |
| 4,159,302 A | 6/1979 | Greve et al. |
| 4,171,985 A | 10/1979 | Motoki |
| 4,225,247 A | 9/1980 | Hodson |
| 4,225,357 A | 9/1980 | Hodson |
| 4,284,119 A | 8/1981 | Martin et al. |
| 4,302,127 A | 11/1981 | Hodson |

(Continued)

FOREIGN PATENT DOCUMENTS

| | | |
|---|---|---|
| CA | 2799983 A1 | 12/2012 |
| CN | 101113077 | 1/2008 |

(Continued)

OTHER PUBLICATIONS

Supplementary European Search Report for EP 15803724 dated Jan. 23, 2018.
XP 000375896 6001 Chemical Abstracts 117 (1992) Aug. 24, No. 8, Columbus, Ohio, US.
Office Action [EP 13809252.3] dated Sep. 3, 2018.
European Extended Search Report for EP 14854429.9 dated Jun. 1, 2017.
International Search Report (KIPO) PCT/US2013/048642 dated Sep. 2, 2013, 17 pp.
International Search Report (KIPO) PCT/US2013/048712 dated Sep. 10, 2013, 20 pp.

(Continued)

*Primary Examiner* — Vishal I Patel
(74) *Attorney, Agent, or Firm* — Daniel J. Chalker; Edwin S. Flores; Chalker Flores, LLP

(57) ABSTRACT

An extrudable cement-based material formed from a mixture that includes cement, water, gypsum, secondary materials, reinforcement fibers and rheology modifying agent. The extrudable cement-based material is a lightweight material that has a density in the range of about 1.4 to 2.4 g/cm$^3$, a compressive strength in the range of about 5 to 100 MPa, and a flexural strength in the range of about 5 to 35 MPa. Note that the cement may contain gypsum such that the gypsum is not added to the mixture.

21 Claims, No Drawings

(56) References Cited

U.S. PATENT DOCUMENTS

| | | | |
|---|---|---|---|
| 4,308,065 A | 12/1981 | Walls-Muycelo | |
| 4,339,487 A | 7/1982 | Mullet | |
| 4,343,127 A | 8/1982 | Greve et al. | |
| 4,347,653 A | 9/1982 | Martin et al. | |
| 4,398,842 A | 8/1983 | Hodson | |
| 4,428,775 A | 1/1984 | Johnson et al. | |
| 4,434,899 A | 3/1984 | Rivkin | |
| 4,443,992 A | 4/1984 | Shechter | |
| 4,489,121 A | 12/1984 | Luckanuck | |
| 4,552,463 A | 11/1985 | Hodson | |
| 4,660,338 A | 4/1987 | Wagner | |
| 4,664,707 A | 5/1987 | Wilson et al. | |
| 4,695,494 A | 9/1987 | Fowler et al. | |
| 4,704,834 A | 11/1987 | Turner | |
| 4,716,700 A | 1/1988 | Hagemeyer | |
| 4,716,702 A | 1/1988 | Dickson | |
| 4,800,538 A | 1/1989 | Passmore et al. | |
| 4,811,538 A | 3/1989 | Lehnert et al. | |
| 4,864,789 A | 9/1989 | Thorn | |
| 4,889,428 A | 12/1989 | Hodson | |
| 4,896,471 A | 1/1990 | Turner | |
| 4,922,674 A | 5/1990 | Thorn | |
| 4,944,595 A | 7/1990 | Hodson | |
| 4,946,504 A | 8/1990 | Hodson | |
| 4,998,598 A | 3/1991 | Mardian et al. | |
| 5,061,319 A | 10/1991 | Hodson | |
| 5,066,080 A | 11/1991 | Woodward | |
| 5,074,087 A | 12/1991 | Green | |
| 5,100,586 A | 3/1992 | Jennings et al. | |
| 5,108,677 A | 4/1992 | Ayres | |
| 5,154,358 A | 10/1992 | Hartle | |
| 5,169,566 A | 12/1992 | Stucky et al. | |
| 5,232,496 A | 8/1993 | Jennings et al. | |
| 5,239,799 A | 8/1993 | Bies et al. | |
| 5,242,078 A | 9/1993 | Haas et al. | |
| 5,250,578 A | 10/1993 | Cornwell | |
| 5,305,577 A | 4/1994 | Richards et al. | |
| 5,311,381 A | 5/1994 | Lee | |
| 5,317,119 A | 5/1994 | Ayres | |
| 5,339,522 A | 8/1994 | Paquin et al. | |
| 5,344,490 A | 9/1994 | Roosen et al. | |
| 5,347,780 A | 9/1994 | Richards et al. | |
| 5,356,579 A | 10/1994 | Jennings et al. | |
| 5,358,676 A | 10/1994 | Jennings et al. | |
| 5,376,320 A | 12/1994 | Tiefenbacher et al. | |
| 5,385,764 A | 1/1995 | Andersen et al. | |
| 5,395,571 A | 3/1995 | Symons | |
| 5,401,588 A | 3/1995 | Garvey et al. | |
| 5,417,024 A | 5/1995 | San Paolo | |
| 5,433,189 A | 7/1995 | Bales et al. | |
| 5,440,843 A | 8/1995 | Langenhorst | |
| 5,453,310 A | 9/1995 | Andersen et al. | |
| 5,482,551 A | 1/1996 | Morris et al. | |
| 5,505,987 A | 4/1996 | Jennings et al. | |
| 5,506,046 A | 4/1996 | Andersen et al. | |
| 5,508,072 A | 4/1996 | Andersen et al. | |
| 5,514,430 A | 5/1996 | Andersen et al. | |
| 5,522,195 A | 6/1996 | Bargen | |
| 5,527,387 A | 6/1996 | Andersen et al. | |
| 5,540,026 A | 7/1996 | Gartland | |
| 5,543,186 A | 8/1996 | Andersen et al. | |
| 5,545,297 A | 8/1996 | Andersen et al. | |
| 5,545,450 A | 8/1996 | Andersen et al. | |
| 5,549,859 A | 8/1996 | Andersen et al. | |
| 5,557,899 A | 9/1996 | Dube et al. | |
| 5,569,514 A | 10/1996 | Ayres | |
| 5,580,409 A | 12/1996 | Andersen et al. | |
| 5,580,624 A | 12/1996 | Andersen et al. | |
| 5,582,670 A | 12/1996 | Andersen et al. | |
| 5,601,888 A | 2/1997 | Fowler | |
| 5,614,307 A | 3/1997 | Andersen et al. | |
| 5,618,341 A | 4/1997 | Andersen et al. | |
| 5,626,954 A | 5/1997 | Andersen et al. | |
| 5,631,052 A | 5/1997 | Andersen et al. | |
| 5,631,053 A | 5/1997 | Andersen et al. | |
| 5,631,097 A * | 5/1997 | Andersen | B28B 1/00 428/220 |
| 5,635,292 A | 6/1997 | Jennings et al. | |
| 5,637,412 A | 6/1997 | Jennings et al. | |
| 5,641,584 A | 6/1997 | Andersen et al. | |
| 5,644,870 A | 7/1997 | Chen | |
| 5,653,075 A | 8/1997 | Williamson | |
| 5,654,048 A | 8/1997 | Andersen et al. | |
| 5,658,603 A | 8/1997 | Andersen et al. | |
| 5,658,624 A | 8/1997 | Andersen et al. | |
| 5,660,900 A | 8/1997 | Andersen et al. | |
| 5,660,903 A | 8/1997 | Andersen et al. | |
| 5,660,904 A | 8/1997 | Andersen et al. | |
| 5,662,731 A | 9/1997 | Andersen et al. | |
| 5,665,439 A | 9/1997 | Andersen et al. | |
| 5,665,442 A | 9/1997 | Andersen et al. | |
| 5,676,905 A | 10/1997 | Andersen et al. | |
| 5,679,145 A | 10/1997 | Andersen et al. | |
| 5,679,381 A | 10/1997 | Andersen et al. | |
| 5,683,772 A | 11/1997 | Andersen et al. | |
| 5,691,014 A | 11/1997 | Andersen et al. | |
| 5,695,811 A | 12/1997 | Andersen et al. | |
| 5,702,787 A | 12/1997 | Andersen et al. | |
| 5,705,203 A | 1/1998 | Andersen et al. | |
| 5,705,237 A | 1/1998 | Andersen et al. | |
| 5,705,238 A | 1/1998 | Andersen et al. | |
| 5,705,239 A | 1/1998 | Andersen et al. | |
| 5,705,242 A | 1/1998 | Andersen et al. | |
| 5,707,474 A | 1/1998 | Andersen et al. | |
| 5,709,827 A | 1/1998 | Andersen et al. | |
| 5,709,913 A | 1/1998 | Andersen et al. | |
| 5,711,908 A | 1/1998 | Tiefenbacher et al. | |
| 5,714,217 A | 2/1998 | Andersen et al. | |
| 5,716,675 A | 2/1998 | Andersen et al. | |
| 5,720,142 A | 2/1998 | Morrison | |
| 5,720,913 A | 2/1998 | Andersen et al. | |
| 5,736,209 A | 4/1998 | Andersen et al. | |
| 5,738,921 A | 4/1998 | Andersen et al. | |
| 5,740,635 A | 4/1998 | Gil et al. | |
| 5,746,822 A | 5/1998 | Espinoza et al. | |
| 5,749,178 A | 5/1998 | Garmong | |
| 5,753,308 A | 5/1998 | Andersen et al. | |
| 5,766,525 A | 6/1998 | Andersen et al. | |
| 5,776,388 A | 7/1998 | Andersen et al. | |
| 5,782,055 A | 7/1998 | Crittenden | |
| 5,783,126 A | 7/1998 | Andersen et al. | |
| 5,786,080 A | 7/1998 | Andersen et al. | |
| 5,798,010 A | 8/1998 | Richards et al. | |
| 5,798,151 A | 8/1998 | Andersen et al. | |
| 5,800,647 A | 9/1998 | Andersen et al. | |
| 5,800,756 A | 9/1998 | Andersen et al. | |
| 5,810,961 A | 9/1998 | Andersen et al. | |
| 5,830,305 A | 11/1998 | Andersen et al. | |
| 5,830,548 A | 11/1998 | Andersen et al. | |
| 5,843,544 A | 12/1998 | Andersen et al. | |
| 5,849,155 A | 12/1998 | Gasland | |
| 5,851,634 A | 12/1998 | Andersen et al. | |
| 5,868,824 A | 2/1999 | Andersen et al. | |
| 5,879,722 A | 3/1999 | Andersen et al. | |
| 5,887,402 A | 3/1999 | Ruggie et al. | |
| 5,916,077 A | 6/1999 | Tang | |
| 5,928,741 A | 7/1999 | Andersen et al. | |
| 5,976,235 A | 11/1999 | Andersen et al. | |
| 6,030,673 A | 2/2000 | Andersen et al. | |
| 6,067,699 A | 5/2000 | Jackson | |
| 6,083,586 A | 7/2000 | Andersen et al. | |
| 6,090,195 A | 7/2000 | Andersen et al. | |
| 6,115,976 A | 9/2000 | Gomez | |
| 6,119,411 A | 9/2000 | Mateu Gill et al. | |
| 6,161,363 A | 12/2000 | Herbst | |
| 6,168,857 B1 | 1/2001 | Andersen et al. | |
| 6,180,037 B1 | 1/2001 | Andersen et al. | |
| 6,200,404 B1 | 3/2001 | Andersen et al. | |
| 6,231,970 B1 | 5/2001 | Andersen et al. | |
| 6,268,022 B1 | 7/2001 | Schlegel et al. | |
| 6,299,970 B1 | 10/2001 | Richards et al. | |
| 6,311,454 B1 | 11/2001 | Kempel | |
| 6,327,821 B1 | 12/2001 | Chang | |
| 6,347,934 B1 | 2/2002 | Andersen et al. | |

(56) References Cited

U.S. PATENT DOCUMENTS

| | | |
|---|---|---|
| 6,379,446 B1 | 4/2002 | Andersen et al. |
| 6,402,830 B1 | 6/2002 | Schaffer |
| 6,434,899 B1 | 8/2002 | Fortin et al. |
| 6,475,275 B1 | 11/2002 | Nebesnak et al. |
| 6,485,561 B1 | 11/2002 | Dattel |
| 6,494,704 B1 | 12/2002 | Andersen et al. |
| 6,503,751 B2 | 1/2003 | Hugh |
| 6,528,151 B1 | 3/2003 | Shah et al. |
| 6,572,355 B1 | 6/2003 | Bauman et al. |
| 6,573,340 B1 | 6/2003 | Khemani et al. |
| 6,581,588 B2 | 6/2003 | Wiedemann et al. |
| 6,619,005 B1 | 9/2003 | Chen |
| 6,643,991 B1 | 11/2003 | Moyes |
| 6,665,997 B2 | 12/2003 | Chen |
| 6,668,499 B2 | 12/2003 | Degelsegger |
| 6,684,590 B2 | 2/2004 | Frumkin |
| 6,688,063 B1 | 2/2004 | Lee et al. |
| 6,696,979 B2 | 2/2004 | Manten et al. |
| 6,743,830 B2 | 6/2004 | Soane et al. |
| 6,745,526 B1 | 6/2004 | Autovino |
| 6,764,625 B2 | 7/2004 | Walsh |
| 6,766,621 B2 | 7/2004 | Reppermund |
| 6,773,500 B1 | 8/2004 | Creamer et al. |
| 6,779,859 B2 | 8/2004 | Koons |
| 6,818,055 B2 | 11/2004 | Schelinski |
| 6,843,543 B2 | 1/2005 | Ramesh |
| 6,866,081 B1 | 3/2005 | Nordgard et al. |
| 6,886,306 B2 | 5/2005 | Churchill et al. |
| 6,890,604 B2 | 5/2005 | Daniels |
| 6,961,998 B2 | 11/2005 | Furchheim et al. |
| 6,964,722 B2 | 11/2005 | Taylor et al. |
| 6,981,351 B2 | 1/2006 | Degelsegger |
| 7,059,092 B2 | 6/2006 | Harkin et al. |
| 7,090,897 B2 | 8/2006 | Hardesty |
| RE39,339 E | 10/2006 | Andersen et al. |
| 7,185,468 B2 | 3/2007 | Clark et al. |
| 7,241,832 B2 | 7/2007 | Khemani et al. |
| 7,279,437 B2 | 10/2007 | Kai et al. |
| 7,297,394 B2 | 11/2007 | Khemani et al. |
| 7,386,368 B2 | 6/2008 | Andersen et al. |
| 7,598,460 B2 | 10/2009 | Roberts, IV et al. |
| 7,617,606 B2 | 11/2009 | Robbins et al. |
| 7,669,383 B2 | 3/2010 | Darnell |
| 7,721,500 B2 | 5/2010 | Clark et al. |
| 7,775,013 B2 | 8/2010 | Bartlett et al. |
| 7,803,723 B2 | 9/2010 | Herbert et al. |
| 7,832,166 B2 | 11/2010 | Daniels |
| 7,886,501 B2 | 2/2011 | Bartlett et al. |
| 7,897,235 B1 | 3/2011 | Locher et al. |
| 7,927,420 B2 | 4/2011 | Francis |
| 7,964,051 B2 | 6/2011 | Lynch et al. |
| 8,037,820 B2 | 10/2011 | Daniels |
| 8,097,544 B2 | 1/2012 | Majors |
| 8,209,866 B2 | 7/2012 | Daniels |
| 8,381,381 B2 | 2/2013 | Daniels |
| 8,650,834 B2 | 2/2014 | Hardwick et al. |
| 8,915,033 B2 | 12/2014 | Daniels |
| 9,027,296 B2 | 5/2015 | Daniels |
| 9,475,732 B2 | 10/2016 | Daniels |
| 9,890,083 B2 | 2/2018 | Daniels |
| 2001/0032367 A1 | 10/2001 | Sasage et al. |
| 2001/0047741 A1 | 12/2001 | Gleeson et al. |
| 2002/0053757 A1 | 5/2002 | Andersen et al. |
| 2002/0078659 A1 | 6/2002 | Hunt |
| 2002/0100996 A1 | 8/2002 | Moyes et al. |
| 2002/0124497 A1 | 9/2002 | Fortin et al. |
| 2002/0128352 A1 | 9/2002 | Soane et al. |
| 2002/0166479 A1 | 11/2002 | Jiang |
| 2003/0015124 A1 | 1/2003 | Klus |
| 2003/0033786 A1 | 2/2003 | Yulkowski |
| 2003/0084980 A1 | 5/2003 | Seufert et al. |
| 2003/0115817 A1 | 6/2003 | Blackwell et al. |
| 2003/0205187 A1 | 11/2003 | Carlson et al. |
| 2003/0209403 A1 | 11/2003 | Daniels |
| 2003/0211251 A1 | 11/2003 | Daniels |
| 2003/0211252 A1 | 11/2003 | Daniels |
| 2004/0025465 A1 | 2/2004 | Aldea |
| 2004/0026002 A1 | 2/2004 | Weldon |
| 2004/0231285 A1 | 11/2004 | Hunt et al. |
| 2004/0258901 A1 | 12/2004 | Luckevich |
| 2005/0092237 A1 | 5/2005 | Daniels |
| 2005/0227006 A1 | 10/2005 | Segall |
| 2005/0241541 A1 | 11/2005 | Hohn et al. |
| 2005/0284030 A1 | 12/2005 | Autovino et al. |
| 2006/0070321 A1 | 4/2006 | Au |
| 2006/0096240 A1 | 5/2006 | Fortin |
| 2006/0168906 A1 | 8/2006 | Tonyan et al. |
| 2006/0287773 A1 | 12/2006 | Andersen et al. |
| 2007/0021515 A1 | 1/2007 | Glenn et al. |
| 2007/0077436 A1 | 4/2007 | Naji et al. |
| 2007/0092712 A1 | 4/2007 | Hodson |
| 2007/0095570 A1 | 5/2007 | Roberts, IV et al. |
| 2007/0125043 A1 | 6/2007 | Clark et al. |
| 2007/0125044 A1 | 6/2007 | Clark et al. |
| 2007/0157537 A1 | 7/2007 | Nicolson et al. |
| 2007/0175139 A1 | 8/2007 | Nicolson et al. |
| 2007/0193220 A1 | 8/2007 | Daniels |
| 2007/0283660 A1 | 12/2007 | Blahut |
| 2008/0016820 A1 | 1/2008 | Robbins, Sr. et al. |
| 2008/0027583 A1 | 1/2008 | Andersen et al. |
| 2008/0027584 A1 | 1/2008 | Andersen et al. |
| 2008/0027685 A1 | 1/2008 | Andersen et al. |
| 2008/0041014 A1 | 2/2008 | Lynch et al. |
| 2008/0066653 A1 | 3/2008 | Andersen et al. |
| 2008/0086982 A1 | 4/2008 | Parenteau et al. |
| 2008/0099122 A1 | 5/2008 | Andersen et al. |
| 2008/0145580 A1 | 6/2008 | McAllister et al. |
| 2008/0152945 A1 | 6/2008 | Miller |
| 2008/0156225 A1 | 7/2008 | Bury |
| 2008/0286519 A1 | 11/2008 | Nicolson et al. |
| 2009/0011207 A1* | 1/2009 | Dubey ............... C04B 20/1051 428/219 |
| 2009/0151602 A1 | 6/2009 | Francis |
| 2009/0197991 A1 | 8/2009 | Bury |
| 2010/0064943 A1 | 3/2010 | Guevara et al. |
| 2010/0071597 A1 | 3/2010 | Perez-Pena |
| 2010/0095622 A1 | 4/2010 | Niemoller |
| 2010/0136269 A1 | 6/2010 | Andersen et al. |
| 2010/0251632 A1 | 10/2010 | Chen et al. |
| 2011/0040401 A1 | 2/2011 | Daniels |
| 2011/0120349 A1 | 5/2011 | Andersen et al. |
| 2011/0131921 A1 | 6/2011 | Chen |
| 2011/0167753 A1 | 7/2011 | Sawyers et al. |
| 2012/0164402 A1 | 6/2012 | Murakami |
| 2012/0208003 A1 | 8/2012 | Beard |
| 2012/0276310 A1* | 11/2012 | Andersen ............... B28B 1/52 428/34.1 |
| 2013/0008115 A1 | 1/2013 | Bierman |
| 2013/0086858 A1 | 4/2013 | Daniels et al. |
| 2013/0216802 A1 | 8/2013 | Leung et al. |
| 2013/0280518 A1 | 10/2013 | Stahl et al. |
| 2014/0000193 A1 | 1/2014 | Daniels et al. |
| 2014/0000194 A1* | 1/2014 | Daniels ............... E06B 3/822 52/232 |
| 2014/0000195 A1 | 1/2014 | Daniels et al. |
| 2014/0000196 A1 | 1/2014 | Daniels et al. |
| 2015/0086769 A1 | 3/2015 | Daniels et al. |
| 2015/0107172 A1 | 4/2015 | Daniels et al. |

FOREIGN PATENT DOCUMENTS

| | | |
|---|---|---|
| CN | 101132999 A | 2/2008 |
| CN | 101239838 | 8/2008 |
| CN | 102001832 A | 11/2010 |
| CN | 102167619 A | 8/2011 |
| CN | 102220829 | 10/2011 |
| CN | 102643013 | 8/2012 |
| CN | 102712531 A | 10/2012 |
| DE | 102006015440 A1 | 10/2007 |
| EP | 1266877 A2 | 12/2002 |
| EP | 2189612 A2 | 5/2010 |
| EP | 2230075 A1 | 9/2010 |
| EP | 2314462 A1 | 4/2011 |
| EP | 2583954 A1 | 4/2013 |

(56) References Cited

FOREIGN PATENT DOCUMENTS

| | | | |
|---|---|---|---|
| GB | 1265471 | A | 3/1972 |
| GB | 1508866 | | 4/1978 |
| JP | 05-0052075 | | 3/1993 |
| JP | H05-097487 | | 4/1993 |
| JP | H06-56497 | A | 3/1994 |
| JP | H11-147777 | | 6/1999 |
| JP | 2004332401 | | 11/2004 |
| JP | 2008036549 | A | 2/2008 |
| JP | 2008201613 | | 9/2008 |
| RU | 2132829 | C1 | 7/1999 |
| RU | 2411218 | C1 | 2/2011 |
| WO | 199105744 | A1 | 5/1991 |
| WO | 2002031306 | A1 | 4/2002 |
| WO | 2003004432 | A1 | 1/2003 |
| WO | 2005105700 | A1 | 11/2005 |
| WO | 2006138732 | A2 | 12/2006 |
| WO | 2007051093 | A2 | 5/2007 |
| WO | 2007053852 | A2 | 5/2007 |
| WO | 2008144186 | A1 | 11/2008 |
| WO | 2009038621 | A1 | 3/2009 |
| WO | 2010141032 | A1 | 12/2010 |
| WO | 2011066192 | A1 | 6/2011 |
| WO | 2012084716 | A1 | 6/2012 |
| WO | 2013082524 | A1 | 6/2013 |

OTHER PUBLICATIONS

International Search Report [KIPO] PCT/US2014/035313 dated Aug. 19, 2014, 10 pp.
International Search Report [KIPO] PCT/US2014/035277 dated Sep. 2, 2014, 15 pp.
Search Report PCT/US07/04605, dated Oct. 4, 2007, 11 pp.
Search Report PCT/US2012/059053 dated Mar. 21, 2013, 12 pp.
Extended European Search Report EP 14759514.4 dated Sep. 23, 2016, 10 pp.
Extended Search Report EP 13845068.9 dated Oct. 12, 2016, 10 pp.
Kralj, D., "Experimental study of recycling lightweight concrete with aggregates containing expanded glass." Process Safety and Environmental Protection, vol. 87, No. 4, Jul. 1, 2809 (Jul. 1, 2009), pp. 267-273.
Office Action [EP 14788791.3] dated Jan. 8, 2019.

* cited by examiner

EXTRUDED CEMENT BASED MATERIALS

CROSS-REFERENCE TO RELATED APPLICATIONS

This application claims priority to, and is the National Stage of International Application No. PCT/US2015/034397 filed on Jun. 5, 2015 and claims priority to U.S. Provisional Patent Application Ser. No. 62/007,984, filed on Jun. 5, 2014. The contents of both applications are hereby incorporated by reference herein in their entirety.

FIELD OF INVENTION

The present invention relates generally to the field of composite materials and, more particularly, to extruded cement-based materials.

BACKGROUND ART

Cement-based materials are generally produced using large amount of water to form a slurry that is too wet to extrude.

SUMMARY OF THE INVENTION

The present invention provides an extrudable cement-based material formed from a mixture that includes cement, water, gypsum, secondary materials, reinforcement fibers and rheology modifying agent. Note that the cement may contain the gypsum such that gypsum is not added to the mixture. The extrudable cement-based material is a lightweight material that has a density in the range of about 1.4 to 2.4 g/cm3, a compressive strength in the range of about 5 to 100 MPa, and a flexural strength in the range of about 5 to 35 MPa.

In addition, the present invention provides an extrudable cement-based material that is formed from a mixture that includes cement in the range of about 0.1 to 90% by wet weight percent, water in the range of about 10 to 60%, gypsum in the range of about 0.1 to 90% by wet weight percent, a secondary material (e.g., sand, rock, fly ash, slag, silica fume, calcium carbonate, etc.) in the range of about 0.1 to 50% by wet weight percent, a reinforcement fiber in the range of about 1 to 20% by wet weight percent and a rheology modifying agent in the range of about 0.5 to 10% by wet weight percent. Note that the cement may contain the gypsum such that gypsum is not added to the mixture.

Moreover, the present invention provides a method for manufacturing an extrudable cement-based material by mixing cement, gypsum, a secondary material, a reinforcement fiber and a rheology modifying agent with water, extruding the mixture through a die using an extruder, and allowing the extruded mixture to set. Note that the cement may contain the gypsum such that gypsum is not added to the mixture.

Furthermore, the present invention provides a method of making the extrudable cement-based material (composite) by the following steps: (1) mixing about 0.1 to 90% Wt. wet cement and 0.1 to 90% Wt. wet gypsum with about 10 to 60% Wt. wet water; (2) blending the cement-gypsum-water mixture with about 0.1 to 50% Wt. wet secondary material (e.g., sand, rock, fly ash, slag, silica fume, calcium carbonate, etc.), and about 1 to 20% Wt. wet reinforcement fiber; and (3) adding about 0.5 to 10% Wt. wet rheology modifying agent to the mixture. The resulting extrudable cement-based material can then be extruded and cured (e.g., allowed to sit, heating, steam, etc.). Note that the cement may contain the gypsum such that gypsum is not added to the mixture.

BRIEF DESCRIPTION OF THE DRAWINGS

The above and further advantages of the invention may be better understood by referring to the following description in conjunction with the accompanying drawings, in which:
None.

DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Ordinary Portland cement (OPC), calcium aluminate cement (CAC), Sorel cement (magnesium oxide and magnesium chloride cements), CSA cement (calcium sulphate aluminate cement), phosphate cement or other cement type known in the State-of-the-Art, in its wet state with water added before setting, can be rheologically modified into a clay-like material, which allows the use of the conventional clay production method known as extrusion.

The cement can be used as a binder with water in a composite composition in combination with a multitude of materials such as fine limestone, sand, gypsum, silica fume, fumed silica, plaster of Paris, fly ash, slag, rock, cellulose fiber, glass fiber, plastic fiber, PVA fiber, Dolanit fiber, etc., which when rheologically modified can be extruded as described above. Note that the cement may contain small amounts of gypsum (e.g., 0.3%, etc.), so adding gypsum to the mixture may not be necessary when the desired gypsum content is in the lower end of the range (see below).

The cement-gypsum-water mixture is stabilized by the addition of a rheology modifying agent typically in an amount of about 0.5 to 10% Wt. wet.

The rheology-modifying agents fall into the following categories: (1) polysaccharides and derivatives thereof, (2) proteins and derivatives thereof, and (3) synthetic organic materials. Polysaccharide rheology-modifying agents can be further subdivided into (a) cellulose-based materials and derivatives thereof, (b) starch based materials and derivatives thereof, and (c) other polysaccharides.

Suitable cellulose-based rheology-modifying agents include, for example, methylhydroxyethylcellulose, hydroxymethylethylcellulose, carboxymethylcellulose, methylcellulose, ethylcellulose, hydroxyethylcellulose, hydroxyethylpropylcellulose, etc.

Suitable starch based materials include, for example, wheat starch, pre-gelled wheat starch, potato starch, pre-gelled potato starch, amylopectin, amylose, seagel, starch acetates, starch hydroxyethyl ethers, ionic starches, long-chain alkylstarches, dextrins, amine starches, phosphate starches, and dialdehyde starches.

The currently preferred rheology-modifying agent is hydroxypropylmethylcellulose, examples of which are Methocel 240 and Methocel 240S.

For extrusion, the cement-based composite with approx. 10-60 Wt. % water of the total wet material and a suitable rheology modifying admixture is made to feel and behave similar to plastic clay. The material feels plastic/deformable to the touch and can be extruded similar to clay with the use of a clay extruder where the material is conveyed forward by an auger through a barrel and is formed continuously through a die into a final shape with form stability.

Depending on the water content and the amount of rheology modifying admixture, the extruded material can have more or less form stability.

By adding a reinforcement fiber to the material increased stability will be achieved before setting of the cement. Further, the fiber addition has been found to reduce or eliminate material shrinkage and drying shrinkage cracks during the drying phase of the production process, and further provide increased flexural strength and toughness of the dry material. The preferred type of fiber is cellulose (hardwood or softwood), plastic (based on poly vinyl alcohol or acrylic) and glass fiber; cellulose and plastic fiber is primarily used for insulation intended for below freezing or ambient temperatures, whereas glass fiber is primarily used for insulation intended for temperatures above ambient or where fire resistance is required. Also, combinations of fiber types can be applied. The preferred fiber length is from about 1 to 2 mm for the cellulose fiber, about 4 to 10 mm for the plastic fiber and about 6 to 20 mm for the glass fiber. The preferred fiber diameter is about 10 to 40 microns.

To increase the time that the cement-based material can be extruded before setting (hardening), the setting time can be retarded up to several hours with the use of small additions of suitable conventional concrete set retarder (e.g., Delvo from the company BASF). The cement-based material can be extruded by conveying the mixture through a barrel using an auger, and continuously forming the mixture into a final shape having form stability through the die using the extruder. Following extrusion, the material will within a few hours develop the initial and final setting of the finished product.

To develop the final 28 days strength of products made from OPC cement, the product is either allowed to sit around for 28 days in a humid environment, or the strength development can be accelerated within 24-48 hours by heating either by its own internal (exothermic) heat development or by steam curing such as is conventional in the State-of-the-Art.

Products made from CAC cement, Sorel cement, CSA cement, phosphate cement or other cement types will achieve its final strength in 24 hours and does not necessarily require additional curing.

After achieving the final strength development, the product is dried to generate the finished composite material. Following hardening, the hardened material can be finished as desired (e.g., cut to size, sanded, trimmed, painted, sealed, textured, imaged, etc.).

In one embodiment, the finished product can be made water repellent by spraying the product with water or solvent based silane. Such product, Protectosil BHN, is typically sold by BASF. The finished product can also be sprayed with anti-fungal or anti-microbial coatings. Moreover, the finished product can be painted, stained or textured.

The finished lightweight cement-based composite will have a density in the range of about 1.4 to 2.4 g/cm3, a compressive strength in the range of about 5 to 100 MPa, and a flexural strength in the range of about 5 to 35 MPa.

The compositional ranges are shown below:

| Material Component | Wt. % Range of Wet |
| --- | --- |
| Cement | 0.1 to 90 |
| Water | 10 to 60 |
| Gypsum (may be part of the Cement) | 0.1 to 90 |
| Secondary Material: Sand, rock, fly ash, slag, silica fume, calcium carbonate, etc. | 0.1 to 50 |
| Reinforcement Fiber | 0.5 to 20 |
| Rheology-Modifying Agent | 0.5 to 10 |
| Retarder (optional) | 0.1 to 8 |

The cement can be 0.1%, 0.2%, 0.3%, 0.4%, 0.5%, 0.6%, 0.7%, 0.8%, 0.9%, 1.0%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89% or 90% by weight or other incremental percentage between.

The water can be 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59% or 60% by weight or other incremental percentage between.

The gypsum can be 0.1%, 0.2%, 0.3%, 0.4%, 0.5%, 0.6%, 0.7%, 0.8%, 0.9%, 1.0%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89% or 90% by weight or other incremental percentage between.

The secondary material can be 0.1%, 0.2%, 0.3%, 0.4%, 0.5%, 0.6%, 0.7%, 0.8%, 0.9%, 1.0%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49% or 50% by weight or other incremental percentage between.

The reinforcement fiber can be 0.5%, 0.6%, 0.7%, 0.8%, 0.9%, 1.0%, 2%, 3%, 4%, 5%, 6%, 7%, 8%, 9%, 10%, 11%, 12%, 13%, 14%, 15%, 16%, 17%, 18%, 19% or 20% by weight or other incremental percentage between.

The rheology modifying agent can be 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9% 4.0% 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, 7.5%, 7.6%, 7.7%, 7.8%, 7.9%, 8.0%, 8.1%, 8.2%, 8.3%, 8.4%, 8.5%, 8.6%, 8.7%, 8.8%, 8.9%, 9.0%, 9.1%, 9.2%, 9.3%, 9.4%, 9.5%, 9.6%, 9.7%, 9.8%, 9.9% or 10% by weight or other incremental percentage between.

The retarder can be 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, 7.5%, 7.6%, 7.7%, 7.8%, 7.9%, or 8.0% by weight or other incremental percentage between.

As a result, the present invention provides an extrudable cement-based material formed from a mixture that includes cement, water, gypsum, secondary materials, reinforcement fibers and rheology modifying agent. The extrudable cement-based material is a lightweight material that has a density in the range of about 1.4 to 2.4 g/cm3, a compressive strength in the range of about 5 to 100 MPa, and a flexural strength in the range of about 5 to 35 MPa. Note that the cement may contain the gypsum such that gypsum is not added to the mixture. In some embodiments, a retarder can be added to the mixture.

In addition, the present invention provides an extrudable cement-based material that is formed from a mixture that includes cement in the range of about 0.1 to 90% by wet weight percent, water in the range of about 10 to 60%, gypsum in the range of about 0.1 to 90% by wet weight percent, a secondary material (e.g., sand, rock, fly ash, slag, silica fume, calcium carbonate, etc.) in the range of about 0.1 to 50% by wet weight percent, a reinforcement fiber in the range of about 0.5 to 20% by wet weight percent and a rheology modifying agent in the range of about 0.5 to 10% by wet weight percent. Note that the cement may contain the gypsum such that gypsum is not added to the mixture. In some embodiments, a retarder in the range of about 0.1 to 8% Wt. wet can be added to the mixture.

Moreover, the present invention provides a method for manufacturing an extrudable cement-based material by mixing cement, a secondary material, a reinforcement fiber and a rheology modifying agent with water, extruding the mixture through a die using an extruder, and allowing the extruded mixture to set. Note that cement may contain gypsum such that gypsum is not added to the mixture, or the gypsum is mixed with the water, or both. In some embodiments, a retarder can be added to the mixture.

Furthermore, the present invention provides a method of making the extrudable cement-based material (composite) by the following steps: (1) mixing about 0.1 to 90% Wt. wet cement and 0.1 to 90% Wt. wet gypsum with about 10 to 60% Wt. wet water, wherein the cement contains the gypsum, or the gypsum is mixed with the cement and water, or both; (2) blending the cement-gypsum-water mixture with about 0.1 to 50% Wt. wet secondary material (e.g., sand, rock, fly ash, slag, silica fume, calcium carbonate, etc.), and about 0.5 to 20% Wt. wet reinforcement fiber; and (3) adding about 0.5 to 10% Wt. wet rheology modifying agent to the mixture. The resulting extrudable cement-based material can then be extruded and cured (e.g., allowed to sit, heating, steam, etc.). In some embodiments, a retarder in the range of about 0.1 to 8% Wt. wet can be added to the mixture.

In another embodiment, the extrudable cement-based material (composite) can be made by the following steps: (1) metering all the ingredients for a batch into a mixer (e.g., Eirich intensive mixer, etc.) at the same time and mixing the ingredients; (2) dumping the mixture into a hopper and extruding the mixture through a die to form an elongated sheet; (3) rolling the elongated sheet through one or more sets of calenders (e.g., two sets, etc.) to a final thickness; (4) cutting the elongated sheet into a set of individual sheets having specified lengths; (5) picking up one or more of the individual sheets and placing them in a stack on a pallet; (6) covering the stack in a plastic and an insulating cover, and placing the stacks in a curing room for a specified period of time (e.g., 24 to 48 hours or other time period necessary to cure the individual sheets); (7) finishing each individual sheet (e.g., squaring up edges, sanding to smooth surfaces and exact dimensions; and (8) applying one or more coatings or inks to each individual sheet (e.g., UV coatings, fire resistant coatings, colors, images, texturing or a combination thereof via coating or printing processes).

Although preferred embodiments of the present invention have been described in detail, it will be understood by those skilled in the art that various modifications can be made therein without departing from the spirit and scope of the invention as set forth in the appended claims.

The invention claimed is:

1. An extrudable cement-based material formed from a mixture comprising:
   a cement in the range of about 0.1 to 88% by wet weight percent;
   a gypsum in the range of about 0.1 to 88% by wet weight percent;
   a secondary material in the range of about 0.1 to 50% by wet weight percent, wherein the secondary material comprising sand, silica fume, fumed silica, fly ash, slag, rock, or a combination thereof;
   a reinforcement fiber in the range of about 0.5 to 20% by wet weight percent, wherein the reinforcement fiber comprising cellulose fiber, glass fiber, polypropylene fiber, polyvinyl alcohol (PVA) fiber, Dolanit fiber, or a combination thereof;
   a rheology modifying agent in the range of about 0.5 to 10% by wet weight percent wherein the rheology modifying agent comprising a polysaccharide, a polysaccharide derivative, a protein, a protein derivative, a synthetic organic material, a synthetic organic material derivative, or a combination thereof;
   a water in the range of 10 to 60% of a total wet material weight; and
   the mixture is extrudable.

2. The extrudable cement-based material as recited in claim 1, wherein the cement contains the gypsum and the gypsum is not added to the mixture.

3. The extrudable cement-based material as recited in claim 1, the mixture having a clay-like consistency.

4. The extrudable cement-based material as recited in claim 1, further comprising a retarder in the range of about 0.1 to 8% by wet weight percent, and the retarder comprising sodium citrate, or a mixture of Plaster of Paris, sodium citrate and crystalline silica.

5. The extrudable cement-based material as recited in claim 1, the extrudable cement-based material having a density in the range of about 1.4 to 2.4 g/cm$^3$, a compressive strength in the range of about 5 MPa to 100 MPa, and a flexural strength in the range of about 5 to 35 MPa.

6. An extrudable cement-based material formed from a mixture consisting essentially of:
   a cement in the range of about 0.1 to 88% by wet weight percent;

a gypsum in the range of about 0.1 to 88% by wet weight percent;

a secondary material in the range of about 0.1 to 50% by wet weight percent, wherein the secondary material comprising sand, silica fume, fumed silica, fly ash, slag, rock, or a combination thereof;

a reinforcement fiber in the range of about 0.5 to 20% by wet weight percent, wherein the reinforcement fiber comprising cellulose fiber, glass fiber, polypropylene fiber, polyvinyl alcohol (PVA) fiber, Dolanit fiber, or a combination thereof;

a rheology modifying agent in the range of about 0.5 to 10% by wet weight percent, wherein the rheology modifying agent comprising a polysaccharide, a polysaccharide derivative, a protein, a protein derivative, a synthetic organic material, a synthetic organic material derivative, or a combination thereof;

a water in the range of 10 to 60% of a total wet material weight; and the mixture is extrudable.

7. A method for manufacturing an extrudable cement-based material comprising:

mixing a cement in the range of about 0.1 to 88% by wet weight percent, a secondary material in the range of about 0.1 to 50% by wet weight percent, a reinforcement fiber in the range of about 0.5 to 20% by wet weight percent, and a rheology modifying agent in the range of about 0.5 to 10% by wet weight percent with water in the range of 10 to 60% of a total wet material weight at a same time, wherein the cement contains a gypsum in the range of about 0.1 to 90% by wet weight percent or the gypsum is added separately or a combination of both, the secondary material comprises sand, silica fume, fumed silica, fly ash, slag, rock, or a combination thereof, the reinforcement fiber comprises cellulose fiber, glass fiber, polypropylene fiber, polyvinyl alcohol (PVA) fiber, Dolanit fiber, or a combination thereof, and the rheology modifying agent comprises a polysaccharide, a polysaccharide derivative, a protein, a protein derivative, a synthetic organic material, a synthetic organic material derivative, or a combination thereof;

extruding the mixture through a die using an extruder; and allowing the extruded mixture to set.

8. A method for manufacturing an extrudable cement-based material comprising:

mixing a cement in the range of about 0.1 to 88% by wet weight percent with a water in the range of 10 to 60% of a total wet material weight, wherein the cement contains a gypsum in the range of about 0.1 to 90% by wet weight percent;

blending the cement-gypsum-water mixture with a secondary material in the range of about 0.1 to 50% by wet weight percent and a reinforcement fiber in the range of about 0.5 to 20% by wet weight percent, wherein the secondary material comprises sand, silica fume, fumed silica, fly ash, slag, rock, or a combination thereof, and the reinforcement fiber comprises cellulose fiber, glass fiber, polypropylene fiber, polyvinyl alcohol (PVA) fiber, Dolanit fiber, or a combination thereof;

adding a rheology modifying agent to the mixture in the range of about 0.5 to 10% by wet weight percent to the mixture, wherein the rheology modifying agent comprises a polysaccharide, a polysaccharide derivative, a protein, a protein derivative, a synthetic organic material, a synthetic organic material derivative, or a combination thereof;

extruding the mixture through a die using an extruder; and allowing the extruded mixture to set.

9. A method for manufacturing an extrudable cement-based material comprising:

mixing a cement in the range of about 0.1 to 88% by wet weight percent and a gypsum in the range of about 0.1 to 90% by wet weight percent with a water in the range of 10 to 60% of a total wet material weight;

blending the cement-gypsum-water mixture with a secondary material in the range of about 0.1 to 50% by wet weight percent and a reinforcement fiber in the range of about 0.5 to 20% by wet weight percent, wherein the secondary material comprises sand, silica fume, fumed silica, fly ash, slag, rock, or a combination thereof, and the reinforcement fiber comprises cellulose fiber, glass fiber, polypropylene fiber, polyvinyl alcohol (PVA) fiber, Dolanit fiber, or a combination thereof;

adding a rheology modifying agent to the mixture in the range of about 0.5 to 10% by wet weight percent to the mixture, wherein the rheology modifying agent comprises a polysaccharide, a polysaccharide derivative, a protein, a protein derivative, a synthetic organic material, a synthetic organic material derivative, or a combination thereof;

extruding the mixture through a die using an extruder; and allowing the extruded mixture to set.

10. The method as recited in claim 7, the mixture having a clay-like consistency.

11. The method as recited in claim 7, wherein extruding the mixture through the die using the extruder comprising:

conveying the mixture through a barrel using an auger; and continuously forming the mixture into a final shape having form stability through the die using the extruder.

12. The method as recited in claim 7, wherein the mixing step further comprises mixing a retarder in the range of about 0.1 to 8% by wet weight percent with the water, and the retarder comprising sodium citrate, or a mixture of Plaster of Paris, sodium citrate and crystalline silica.

13. The method as recited in claim 7, the extrudable cement-based material having a density in the range of about 1.4 to 2.4 g/cm$^3$, a compressive strength in the range of about 5 MPa to 100 MPa, and a flexural strength in the range of about 5 to 35 MPa after being set, cured or dried.

14. The method as recited in claim 7, wherein the extruded mixture comprises an elongated sheet and further comprising the step of rolling the elongated sheet through one or more sets of calenders.

15. The method as recited in claim 14, further comprising:

cutting the elongated sheet into a set of individual sheets having a specified length;

stacking the set of individual sheets onto a pallet;

covering the stack with a plastic and an insulating material;

curing the stack by allowing the covered stack to sit for a specified time period; and squaring up and sanding each individual sheet.

16. The method as recited in claim 15, wherein the specified time period is approximately 24 to 48 hours.

17. The method as recited in claim 7, wherein the extruded mixture is allowed to set for up to 2 to 3 hours.

18. The method as recited in claim 7, further comprising curing or drying the extruded mixture.

19. The method as recited in claim 7, further comprising molding, cutting, trimming, sanding or routing the extruded mixture into a specified shape.

20. The method as recited in claim 7, further comprising spraying the extruded mixture with a water repellent.

21. The method as recited in claim 7, further comprising applying one or more coatings or inks to the extruded mixture, and wherein the one or more coatings or inks comprise a UV coating, a fire resistant coating, a color, an image, a texture or a combination thereof.

\* \* \* \* \*